April 26, 1938.  J. DE COLA ET AL  2,115,328

HYDRAULIC JACK FOR VEHICLES

Filed Feb. 1, 1937

INVENTORS.
JOHN DE COLA.
LARS CHRISTENSEN.
BY.
H. A. Dickman
ATTORNEY.

Patented Apr. 26, 1938

2,115,328

UNITED STATES PATENT OFFICE 2,115,328

HYDRAULIC JACK FOR VEHICLES

John De Cola, Wilmington, and Lars Christensen, Long Beach, Calif.

Application February 1, 1937, Serial No. 123,378

4 Claims. (Cl. 254—86)

This invention relates to a hydraulic jack for vehicles whereby either the front or rear end of the vehicle can be raised for the purpose of removing tires or repairing the wheels of the vehicle.

An object of our invention is to provide a hydraulic jack which is so attached to the vehicle that said vehicle is stable when either end is elevated by the jack, that is, the vehicle will not tilt from side to side.

Another object of our invention is to provide a hydraulic jack of the character stated with two hydraulic rams, the rams being pivotally mounted in spaced relation to each other and both rams simultaneously acting upon the ground-engaging shoe.

Another object of our invention is to provide a hydraulic jack of the character stated which can be easily attached to any motor vehicle, and which is operable by a manually actuated pump from the seat of the vehicle.

Other objects, advantages and features of invention may appear from the accompanying drawing, the subjoined detailed description and the appended claims.

Figure 1:
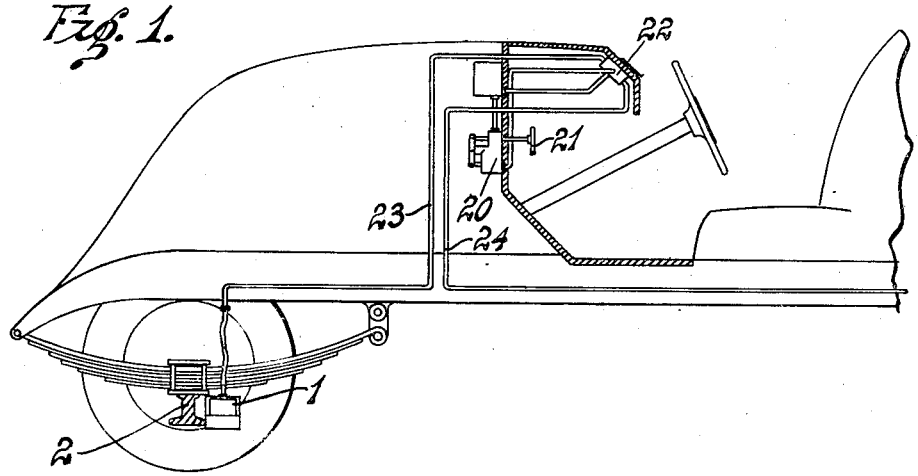
Figure 1 is a fragmentary diagrammatical view of the vehicle with our hydraulic jack in position on the front axle thereof.

Referring more particularly to the drawing, a housing 1 is rigidly attached to either the front or rear axles of the vehicle. It is understood that a jack is to be attached to both the front and rear axles of the vehicles. We have only illustrated attachment to the front axle 2 as shown in Figure 1 of the drawing. The housing 1, may be bolted, welded, or otherwise fixedly attached to the axle. The housing 1 is preferably a channel construction and supports a pair of hydraulicalic rams (3—4). These rams are each pivotally attached to the housing 1 at the outer ends thereof as shown at 5—6. The hydraulic rams are identical in construction and each consists of an inner cylinder 7 and an outer sleeve 8 which is radially spaced from the cylinder.

A piston 9 is provided in the cylinder and a piston rod 10 extends from the piston and projects out of the cylinder. The two piston rods 10 are pivotally attached together by the pin 11, a ground-engaging shoe 12 is linked to the piston rods 10 by the pivoted links 13. The links 13 serve to keep the shoe 12 substantially horizontal so as to properly engage the ground.

In order that the rams 3—4 may operate simultaneously, and also, that the piston rods 10—10 shall be moved at a uniform rate of speed, we provide a guiding means on each of the rams which includes a cross-head 14 which projects outwardly from the piston rod and extends through suitable longitudinal slots 15—16 in the cylinder and sleeve, respectively.

A pair of bifurcated couplings 17—17 are pivotally attached to the pin 11. A pair of rods 18 are attached to each of the couplings 17—17 and extends to the cross-head 14. These rods are also journaled on the cross-head. A coil spring 19 bears against the cross-head 14 and tends to retract the pistons 9 and thereby elevates the shoe 14. It will be evident that when a fluid under pressure is introduced into the cylinders 7, that the pistons 9 and piston rods 10 will be simultaneously urged outwardly whereupon the shoe 12 will be pressed downwardly against the ground, thus, elevating the front or rear end of the vehicle.

Figure 2:
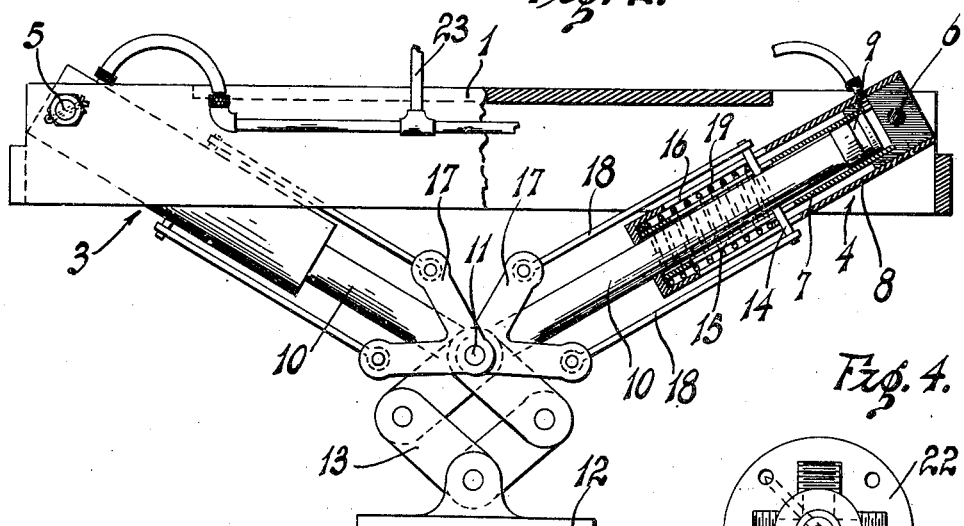
Figure 2 is a side elevation of our jack with parts broken away to show interior construction.
Figure 4:
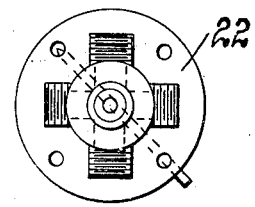
Figure 4 is a plan view of the four-way control valve.
Figure 3:
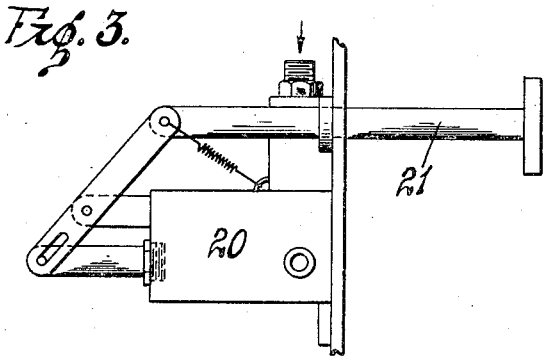
Figure 3 is a side elevation of the pump.

A manually operable pump 20 is mounted on the dash of the vehicle. This pump is of the usual well-known plunger type and is actuated by the push-rod 21. The pump forces the fluid under pressure to the the four-way valve 22 and by adjusting this valve the fluid can be directed to the lines 23 or 24 to the front or rear jacks as desired. The fluid, under pressure, enters the hydraulic rams simultaneously, as is evident from the pipe arrangement shown in Figure 2.

Having described our invention, we claim:

1. A hydraulic jack for vehicles comprising a housing adapted to be fixedly attached to an axle of the vehicle, a pair of rams pivotally mounted in the housing in spaced relation to each other, a piston rod projecting from each of the rams, said piston rods being pivotally secured together and a shoe attached to said piston rods.

2. A hydraulic jack for vehicles comprising a housing adapted to be fixedly attached to an axle of the vehicle, a pair of rams pivotally mounted in the housing in spaced relation to each other, a piston rod projecting from each of the rams, said piston rods being pivotally secured together and a shoe attached to said piston rods, and guide means on each of the rams.

3. A hydraulic jack for vehicles comprising a housing, a pair of rams pivotally mounted in the housing at each end thereof, a piston rod projecting from each of the rams, said piston rods being pivotally secured together, a shoe, link means extending from the shoe to the pivot of the piston rods, a pair of couplings pivotally mounted on the pivot for the piston rods, a cross head in each of the rams, and connecting rods pivotally attached to said couplings and to the cross head.

4. A hydraulic jack for vehicles comprising a housing adapted to be fixedly attached to an axle of the vehicle, a pair of rams mounted to the housing and spaced relation to each other, a piston rod projecting from each of the rams, said piston rods being pivotally connected, and a shoe attached to said piston rods.

JOHN DE COLA.
LARS CHRISTENSEN.